United States Patent [19]

Marutake et al.

[11] Patent Number: 4,489,330

[45] Date of Patent: Dec. 18, 1984

[54] ELECTROMAGNETIC INDUCTION COIL ANTENNA

[75] Inventors: Yozo Marutake, Hino; Tatsuro Fukutome, Inagi; Motomu Asami, Akishima; Hideo Motohashi, Suginami, all of Japan

[73] Assignee: Rion Kabushiki Kaisha, Japan

[21] Appl. No.: 421,660

[22] Filed: Sep. 22, 1982

[30] Foreign Application Priority Data

Oct. 1, 1981 [JP] Japan .................. 56-156833

[51] Int. Cl.³ .................. H01Q 1/36; H04R 25/00
[52] U.S. Cl. .................. 343/742; 343/876; 179/107 R
[58] Field of Search .................. 343/705, 718, 742; 179/82, 107 R; 381/68

[56] References Cited

U.S. PATENT DOCUMENTS 3,259,900 7/1966 Lord .................................. 343/705
3,718,932 2/1973 Ikrath et al. ...................... 343/742

*Primary Examiner*—Eli Lieberman
*Attorney, Agent, or Firm*—Beveridge, DeGrandi & Kline

[57] ABSTRACT

The invention relates to an electromagnetic induction coil or antenna device embedded in hearing aids or radio sets for receiving sound signals or carrier signals generated by a primary electromagnetic induction coil which is laid down in the room. A plurality of coils each one end of which is commonly connected and each other end of which extends outwardly from the one end so as to be uniformly arranged in a space and a phase selector connected to the coils operates, as a mercury switch, to pick up positive phase component output signals which are induced in at least any of the coils. The coils and the phase selector are fixedly built in the body of a hearing aid, etc. so that the corresponding coil and conduit in which a suitable quantity of mercury is charged may be paralleled to each other and so on, thereby to obtain a constant output sound pressure irrespective of the posture of a person wearing a hearing aid or enjoying television.

4 Claims, 5 Drawing Figures

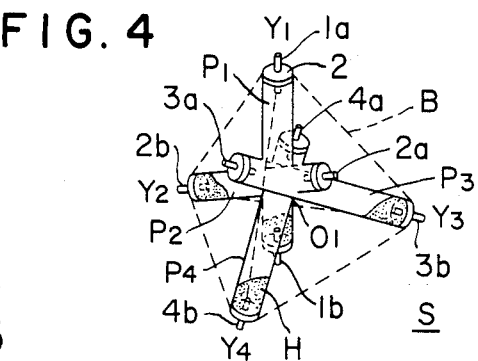
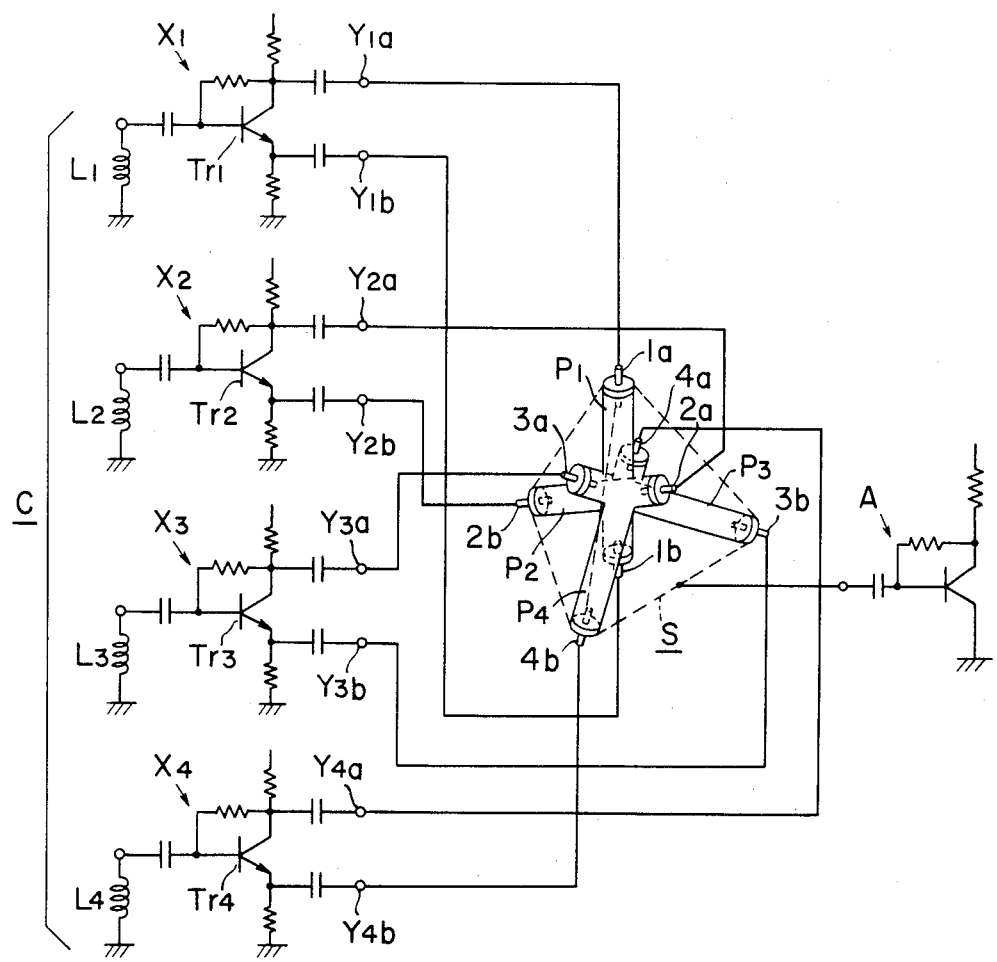

ELECTROMAGNETIC INDUCTION COIL ANTENNA

BACKGROUND OF THE INVENTION

This invention relates to an electromagnetic induction coil or antenna device, and more particularly to such a coil device embedded in hearing aids for receiving sound signals generated by a primary electromagnetic induction coil or a loop coil which is laid down in a room.

The invention herein is principally described and illustrated in a specific embodiment wherein it is applied to personal hearing aids. Conventionally, since an electromagnetic induction coil (hereinafter referred to as an induction coil) built-in personal hearing aids couples magnetically to a sound magnetic field which is generated in response to a sound signal current flowing through a primary induction coil laid down inside the floor of a room or placed in the ceiling thereof, it is very useful for a mass-hearing medium of persons who are hard of hearing in an educational field. Such a hearing medium is able to reduce obstacles in hearing due to the distance between speaker and listener and environmental noises, comparing it with the way of directly receiving sounds through a microphone. Accordingly, it greatly assists in an improvement of S-N ratio and, in particular, is effective in an educational field of persons who are hard of hearing. Recently, it has been popular to use, in a family, such a device in enjoying television. However, in the conventional induction coil devices, the induction coil is fixedly arranged to the body of the hearing aid with a constant positional relationship, and also the distribution of the intensity of the sound magnetic field at a hearing position is directional. For these reasons, there has been a great disadvantage in that when a person who uses a hearing aid changes his posture, the posture of the induction coil embedded in the hearing aid is resultantly changed and also the output signal of the ear-phone of the hearing aid varies remarkably. These difficulties have been drawbacks in the case of aiding the hearing ability of hearing loss children through music or physical exercise and in the case when persons enjoy a television with their bodies relaxed.

In order to solve such problems, various induction coil devices have been proposed, but these have suffered from a dead angle not so as to obtain sufficient advantages.

SUMMARY OF THE INVENTION

An object of this invention is to provide an induction coil device adapted for a hearing aid or an antenna in which the above-described difficulties accompanying conventional devices have been eliminated.

Another object of this invention is to provide an induction coil device adapted for a hearing aid wherein the variation of an output sound pressure is always minimized irrespective of the physical movement of a person wearing the hearing aid.

The foregoing object and other objects of the invention have been achieved by the provision of an electromagnetic induction coil device cooperating with a primary induction coil system, which comprises a plurality of coils each of which has one end commonly connected and the other end extending outwardly from said one end so as to be uniformly arranged in a space and a phase selector connected to said coils for picking up positive phase component output signals which are induced in any of said coils.

The nature, principle and utility of the invention will become more apparent from the following detailed description when read in conjunction with the accompanying drawings, in which like parts are designated by like reference numerals or characters.

BRIEF DESCRIPTION OF THE INVENTION

In the accompanying drawings:

FIG. 4 is a schematic view of a phase selector of another example of the present invention; and FIG. 5 is a connection diagram of the device including a phase selector as illustrated in FIG. 4.

DETAILED DESCRIPTION OF THE INVENTION

Figure 1:
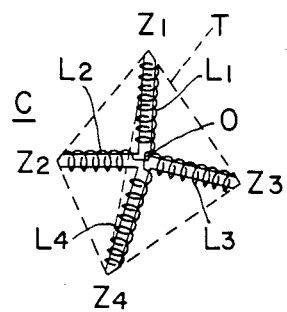
FIG. 1 is a perspective view of induction coils to be built in a hearing aid according to the present invention.
Figure 2:
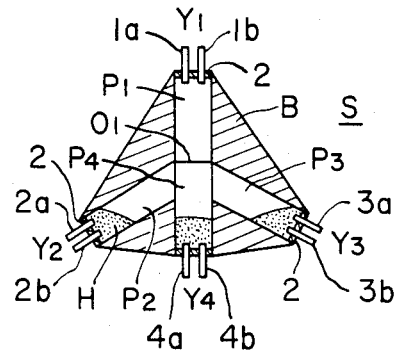
FIG. 2 is a sectional view of a phase selector according to the present invention.
Figure 3:
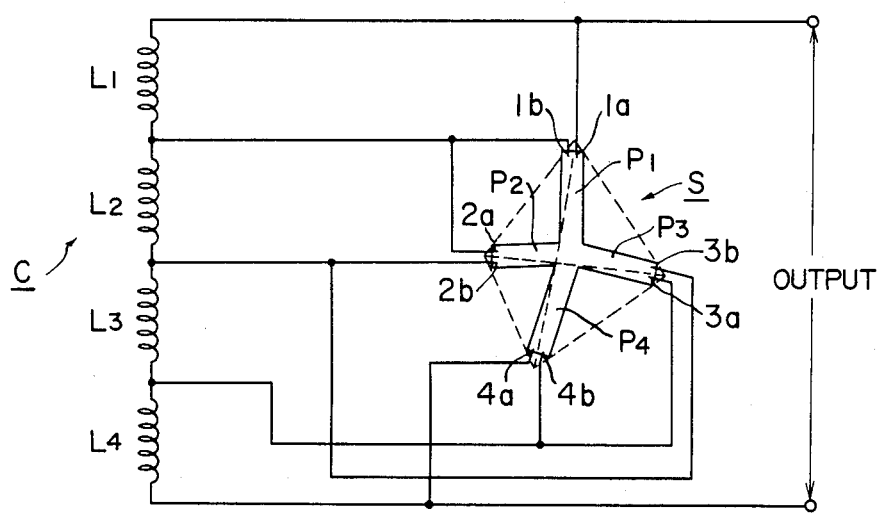
FIG. 3 is a connection diagram of one example of the present invention.

Referring to FIGS. 1 to 3, a first example will be described, in which an electromagnetic induction coil device for a hearing aid is provided with a phase selector including a circuit for shorting a coil or coils wherein output signals of inverse polarity to positive phase component output signals are induced. In FIG. 1, an induction coil C is composed of four coils $L_1$, $L_2$, $L_3$ and $L_4$ which have the same winding direction and extend outwardly along the lines from the center O of a regular tetrahedron T to each of four apexes $Z_1$, $Z_2$, $Z_3$ and $Z_4$ thereof, and the induction coil C is fixedly built in the body of a hearing aid (not shown). In FIG. 2, a phase selector S connected to the induction coil C is shown and in a regular tetrahedron-like insulating block B are cut through four conduits $P_1$, $P_2$, $P_3$ and $P_4$ along the lines from the center $O_1$ of the regular tetrahedron to each of four apexes $Y_1$, $Y_2$, $Y_3$ and $Y_4$ thereof. Accordingly, the conduits $P_1$, $P_2$, $P_3$ and $P_4$ interconnect at the point O, and also a suitable quantity of a conductive fluid such as mercury is charged therein. Further, each open end of the conduits is sealed by a insulating cover 2 with a pair of terminals 1a and 1b.

In the example, the insulating block B, the side length of which is 10 mm, is used, the diameter of the conduits $P_1$, $P_2$, $P_3$ and $P_4$ is about 3 mm and the quantity of mercury is about 0.5 gram, as a result of which a remarkably good effect can be obtained. In addition, the configuration of the insulating block B may be modified to other ones. It is important that the induction coil C and the phase selector S are fixedly built in the body of a hearing aid so that the corresponding coil $L_1$ and conduit $P_1$ thereof may be parallel to each other and so on. Also, such a unit construction of the induction coil C and the phase selector S makes it easy to build the unit in the body of a hearing aid. The induction coil C and the phase selector S are, as is shown in FIG. 3, electrically connected to each other, wherein both ends of the coil $L_1$ are connected to the terminals 1a and 1b arranged at the open end of the corresponding conduit $P_1$, both ends of the coil $L_2$ are connected to the terminals 2a and 2b, both ends of the coil $L_3$ are connected to the terminals 3a and 3b, both ends of the coil $L_4$ are connected to the terminals 4a and 4b, respectively and the outputs of each of coils $L_1$, $L_2$, $L_3$ and $L_4$ are added to be picked up at the output terminals.

Hereafter, the operation of the device of the example will be described. Generally, a primary induction coil or a loop coil magnetically coupling to secondary induction coils embedded in a hearing aid, etc. is laid under the floor of a room, so that the direction of a sound magnetic field generated by the primary induction coil is perpendicular to the floor. Thus, in the case where the primary induction coil (not shown) is horizontally laid down, if the coil $L_1$ has, as is shown in FIG. 1, a perpendicular direction, other coils $L_2$, $L_3$ and $L_4$ have downwardly inclined directions. In this case, the coil $L_1$ has the best sensitivity for the sound magnetic field and a sound output current induced in the coil $L_1$ becomes largest. On the other hand, sound output currents induced in other coils $L_2$, $L_3$ and $L_4$ are relatively small and also have phases opposite to that of the current induced in the coil $L_1$ because coils $L_2$, $L_3$, and $L_4$ incline downwardly. Under this condition, the phase selector S takes a posture as is shown in FIG. 2, each of terminals $2a$, $2b$; $3a$, $3b$; $4a$, $4b$ of the conduits $P_2$, $P_3$ and $P_4$ is shorted by mercury H and only terminals $1a$, $1b$ of the conduit $P_1$ are open. Accordingly, only the output of the coil $L_1$ appears across the output terminals of FIG. 3. Assuming that the coil $L_1$ would gradually incline from the posture in FIG. 2, resultantly the output thereof would be gradually reduced, while any of other coils, for example, the coil $L_2$ would incline upwardly, and the output thereof which has the same phase as that of the coil $L_1$ would be gradually increased. As a result of which, the terminals $2a$, $2b$ of the conduit $P_2$ are caused to open and the outputs of both coils $L_1$ and $L_2$ are added, appearing across the output terminals in FIG. 3. Thus, in this example of the present invention, only the sound output currents of the same phase induced in any of the coils $L_1$, $L_2$, $L_3$ and $L_4$ can be added and picked up, while those of the opposite phase are cancelled by shorting any of the corresponding coils irrespective of the posture of the body of a hearing aid in which the device of the present invention is incorporated. According to the experimental data, whatever the posture of a hearing aid may vary, the total sound output current ranges within the scope of about 1.3 dB.

Hereafter, another example of the present invention will be described by referring to FIGS. 4 and 5. FIG. 4 illustrates a regular tetrahedron-like conductive block B the side length of which is almost 10 mm and which has four conduits $P_1$, $P_2$, $P_3$ and $P_4$ for charging a suitable quantity of conductive fluid, for example, mercury. Conduits $P_1$, $P_2$, $P_3$ and $P_4$ described above are formed so that they extend from each apex $Y_1$, $Y_2$, $Y_3$ and $Y_4$ of the conductive block B, through the center $O_1$ thereof to each of the corresponding planes, and accordingly they intersect each other at the center $O_1$ of the conductive block B.

The diameter of each conduit is actually selected to be about 3 mm, and both ends of each conduit are sealed by an insulating cover 2 with a terminals $1a$, $1b$, $2a$, $2b$, $3a$, $3b$, $4a$ or $4b$ therein. As is apparent from FIG. 5, the induction coil C which is composed of four coils $L_1$, $L_2$, $L_3$ and $L_4$ is electrically connected through phase selecting circuits $X_1$, $X_2$, $X_3$ and $X_4$ to a phase selector S which is substantially composed from the conductive block B. Also, four coils $L_1$, $L_2$, $L_3$ and $L_4$ and the phase selector S are fixedly arranged in the body of a hearing aid so that the corresponding coils and conduits are parallel to each other. In this case, it may be well to organize the induction coil C and the phase selector S in a unitized structure. The coils $L_1$, $L_2$, $L_3$ and $L_4$ in FIG. 5 correspond to the coils represented by the same references in FIG. 1, respectively. The output end of the coil $L_1$ is connected to the phase selecting circuit $X_1$ including a transistor $Tr_1$, and also the output ends of the coils $L_2$, $L_3$ and $L_4$ are connected to the corresponding phase selecting circuits $X_2$, $X_3$ and $X_4$ in the same manner. In this case, it is noted that output currents which are 180° out of phase to each other can be obtained at the output ends of the phase selecting circuit $X_1$, namely at the collector terminal $Y_{1a}$ and at the emitter terminal $Y_{1b}$. The terminals $Y_{1a}$ and $Y_{1b}$ are respectively connected to terminals $1a$ and $1b$ mounted at the ends of the conduit $P_1$ which is correspondent to the coil $L_1$ of the phase selector S. Thus, the same relationship is established between terminals $Y_{2a}$, $Y_{2b}$; $Y_{3a}$, $Y_{3b}$; $Y_{4a}$, $Y_{4b}$ of other phase selecting circuits $X_2$; $X_3$; $X_4$ and terminals $2a$, $2b$; $3a$, $3b$; $4a$, $4b$ respectively of other conduits $P_2$; $P_3$; $P_4$. The outputs of these coils $L_1$, $L_2$, $L_3$ and $L_4$ are added and then are supplied to an amplifier A (not specified) through the conductive block B.

Hereafter the operation of this example of the device will be described. In the case where, as is shown in FIG. 4, the mercury H is dispersed at the lower end parts of conduits $P_1$, $P_2$, $P_3$ and $P_4$ in which the terminals $1_b$, $2_b$, $3_b$ and $4_b$ are located, respectively, the outputs of the coils $L_1$, $L_2$, $L_3$ and $L_4$ are picked up only at the sides of terminals $Y_{1b}$, $Y_{2b}$, $Y_{3b}$ and $Y_{4b}$. Accordingly, the picked up output currents are of the same phase, being added at the phase selector S and then being applied to the amplifier A. If the coil $L_1$ inclines from the posture in FIG. 4, the output thereof will be reduced. On the other hand, since any of other coils $L_2$, $L_3$ and $L_4$, for example, the coil $L_2$ rises toward the perpendicular direction, the outputs of the same phase which are picked up at the sides of terminals $Y_{2b}$, $Y_{1b}$, $Y_{3b}$ and $Y_{4b}$ are supplied to the phase selector S. Furthermore, as the inclination of the coil $L_1$ progresses, the coil $L_1$ takes the inversed posture to that shown in FIG. 4, the outputs of the same phase which are picked up at the sides of terminals $Y_{1a}$, $Y_{2a}$, $Y_{3a}$ and $Y_{4a}$ are supplied to the phase selector S.

As is apparent from the above descriptions, the output sensitivity of the device according to the invention does not reduce even if a person who wears a hearing aid equipped with the device assumes various postures. According to the actual measurement, it is noted that the output of the device of the present invention merely varies within the scope of 2 dB for the variation of the positioning of a hearing aid. Although, in the example, the winding direction of the coils $L_1$, $L_2$, $L_3$ and $L_4$ is set to be of the same, it is not necessary to do so. Where the winding direction of any coil or coils is reversed, it may be well to change the connection between the output terminals of the phase selecting circuits $X_1$, $X_2$, $X_3$ and $X_4$ and terminals of the phase selector S in response to the inversion described above. Further, an induction coil can be organized by two or three coils which intersect at a right angle to each other in accordance with the condition of use of a hearing aid.

We claim:

1. An electromagnetic induction coil device for cooperating with a primary induction coil system, comprising:

an electromagnetic coil assembly including four coils each having a first end connected to the first end of each of the four coils at a center junction and a second end, each coil having the same winding direction and extending outwardly from said center junction along the lines from the center of a regular tetrahedron to each of the four apexes thereof to be uniformly spatially arranged;

a phase selector including a regular tetrahedron shaped insulating block having four conduits cut therethrough along the lines from the center junction of the regular tetrahedron thereof to the four apexes thereof; a quantity of electrically conductive liquid within said conduits; four insulating covers sealing the ends of said conduits, each cover having two terminals therethrough to cause such terminals to be shorted together by contact with the electrically conductive liquid when such terminals are below said insulating block center junction, said conduits being positioned so that each conduit thereof extends in parallel with a corresponding coil of said coil assembly;

means connecting the ends of each coil to the terminals of the correspondingly extending one of said conduits; and a pair of output terminals connected across the coil assembly for providing as an output signal positive phase component output signals induced in at least one of said coils.

2. An electromagnetic induction coil device for cooperating with a primary induction coil system, comprising:

an electromagnetic coil assembly including at least two coils connected in parallel and having, as their own axes, at least two axes of rectangular coordinates;

a phase selector including a conductive block having at least two conduits cut therethrough, each conduit having the direction of a respective rectangular coordinate; a quantity of electrically conductive liquid within said conduits; a pair of insulating covers for each conduit, one insulating cover sealing each end of each of said conduits, each insulating cover having a terminal therethrough to cause such terminal to contact the electrically conductive liquid when such terminal is below the other terminal of that conduit, each of said conduits being positioned to extend in parallel with a corresponding coil of said coil assembly;

a phase selecting circuit for picking up coil output signals of different phase from each other induced in said coils and coupling such signals to said phase selector terminals for switching such signals in accordance with variation of position of said coils; and output means connected to said phase selector for providing as a device output signal the summed switched coil output signals.

3. An electromagnetic induction coil device for cooperating with a primary induction coil system, comprising:

a phase selector including a regular tetrahedron shaped conductive block having four conduits cut therethrough from the four apexes thereof, through the center thereof to the opposite planes thereof, such conduits intersecting each other at a center junction at the tetrahedron center; a quantity of electrically conductive liquid within said conduits; a pair of insulating covers for each conduit, one insulating cover sealing each end of each of said conduits, each insulating cover having a terminal therethrough to cause such terminal to contact the electrically conductive liquid when such terminal is below the other terminal of that conduit;

an electromagnetic coil assembly including four coils, each coil extending in parallel with a corresponding one of said conduits;

four phase selecting circuits, one phase selecting circuit coupling the each of said coils to the terminals of the corresponding one of said conduits; and output means connected to said phase selector for providing as a device output signal the summed signals of said coils.

4. An electromagnetic induction coil device as claimed in claim 2 wherein said assembly includes three coils extending along three axes of a rectangular coordinate and said phase selector includes a conductive block which has three conduits corresponding to said coils.

* * * * *